US006573888B2

(12) United States Patent
Hayashi et al.

(10) Patent No.: US 6,573,888 B2
(45) Date of Patent: Jun. 3, 2003

(54) IMAGE CONTROL SYSTEM CONTROLLING TRAFFIC OF A MOBILE BODY, SUCH AS AN AIRCRAFT

(75) Inventors: Keiko Hayashi, Tokyo (JP); Kakuichi Shiomi, Tokyo (JP)

(73) Assignees: NEC Corporation, Tokyo (JP); Electronic Navigation Research Institute, Independent Administrative Institution, Tokyo (JP)

( * ) Notice: Subject to any disclaimer, the term of this patent is extended or adjusted under 35 U.S.C. 154(b) by 195 days.

(21) Appl. No.: 09/731,583

(22) Filed: Dec. 7, 2000

(65) Prior Publication Data

US 2001/0003809 A1 Jun. 14, 2001

(30) Foreign Application Priority Data

Dec. 8, 1999 (JP) .......................................... 11-348349

(51) Int. Cl.$^7$ ............................ G09G 3/36; G09G 5/08; G01S 3/02; G05D 1/00

(52) U.S. Cl. ......................... 345/204; 345/97; 345/109; 345/156; 345/158; 342/455; 701/3

(58) Field of Search ........................... 345/97, 98, 109, 345/156, 158, 204, 507, 515, 516, 841; 348/36, 39, 51; 700/79; 340/468, 961; 342/53, 455; 367/68–72; 701/1–16

(56) References Cited

U.S. PATENT DOCUMENTS

| | | | | | |
|---|---|---|---|---|---|
| 4,592,053 | A | * | 5/1986 | Matsuura | 700/79 |
| 4,914,734 | A | * | 4/1990 | Love et al. | 342/53 |
| 5,732,384 | A | * | 3/1998 | Ellert et al. | 345/841 |
| 5,742,331 | A | * | 4/1998 | Uomori et al. | 345/156 |
| 6,314,362 | B1 | * | 11/2001 | Erzberger et al. | 340/961 |
| 6,411,874 | B2 | * | 6/2002 | Morgan et al. | 340/468 |

* cited by examiner

*Primary Examiner*—Bipin Shalwala
*Assistant Examiner*—Prabodh Dharia
(74) *Attorney, Agent, or Firm*—Dickstein, Shapiro, Morin & Oshinsky, LLP.

(57) ABSTRACT

In an air traffic control system for controlling aircraft a three-dimensional position is provided to monitor a position of an air traffic controller. An image is displayed on a display portion with reference to the position of the controller. The image displayed on the display portion always appears in a front image regardless of the position of the controller or may be selected to be displayed on a selected area of the display portion determined by the position of the controller.

20 Claims, 4 Drawing Sheets

IMAGE CONTROL SYSTEM CONTROLLING TRAFFIC OF A MOBILE BODY, SUCH AS AN AIRCRAFT

BACKGROUND OF THE INVENTION

This invention relates to a traffic control system for use in carrying out traffic control and, in particular to an air traffic control system for controlling air traffic of an aircraft. It is to be noted throughout the instant specification that the following description will be mainly made about the air traffic control system but this invention may not be restricted to the air traffic control system but any other traffic control system for controlling a mobile body, such as vehicle or ship.

In general, a conventional air traffic control system of the described has a display portion which is fixed to a housing or on a console and which is used for displaying air traffic control information. An air traffic controller carries out air traffic control or the like on the basis of air traffic control information displayed on the display portion. In this event, the air traffic control information is displayed on a screen of the display portion which is directed to a predetermined direction on the display portion, regardless of a position of the air traffic control controller. As a result, the air traffic controller can watch or accurately observe an image of the air traffic control information in front of the screen, as long as the air traffic controller watches the screen at a predetermined front position.

However, it is to be noted that the air traffic controller must be often moved to any other air traffic control information. In this event, the air traffic controller watches or views an image of the air traffic control information from an oblique or inclined direction, because the air traffic controller can not watch the screen from the predetermined front position.

For example, the air traffic controller may not only always sit down a chair but also may stand up from the chair. When the air traffic controller stands up from the chair, the display portion is looked at from an oblique direction different from the predetermined direction. Such an observation from an oblique position or a direction different from the predetermined direction undesirably distorts or deforms an image displayed on the display portion. The distorted image might make it difficult to accurately navigate or control aircraft or airplanes.

In other words, the conventional air traffic control system is disadvantageous in that visibility becomes bad when the air traffic control information is observed from a position remote from the predetermined position.

In addition, the display portion and a switching board for switching displays from one to another are fixed to the predetermined position in the conventional air traffic control system, as mentioned before. Therefore, the switching board should be manually switched on switching the displayed images from one to another after the air traffic controller moves to the switching board. Accordingly, the conventional system is low in workability.

SUMMARY OF THE INVENTION

It is an object of this invention to provide an image control system which is applicable to an air traffic control system and which can avoid distortion of an image even when the image is watched from an inclined position different from a front position of a screen of a display portion.

It is another object of this invention to provide a traffic control system which is capable of always giving appropriate information to an air traffic controller regardless of his or her position and to thereby reduce a load of the air traffic controller.

It is another object of this invention to provide an air traffic control system of the type described, which is excellent in visibility of a display portion.

It is still another object of this invention to provide an air traffic control system which can realize safe traffic control.

An air traffic control system to which this invention is applicable is for use in providing air traffic control information to an air traffic controller so as to control traffic of an aircraft. According to an aspect of this invention, the air traffic control system comprises a position detection sensor for detecting a position of the air traffic controller to obtain position information representative of the position of the air traffic controller and means for selectively displaying the air traffic control information in a predetermined order in accordance with the position information.

According to a specific aspect of this invention, the air traffic control system comprises a position detection sensor for detecting a position of the air traffic controller to obtain position information representative of the edition of the air traffic controller, a display renewal judgement portion fur judging whether or not display is to be renewed with reference to the position information to obtain and to produce judgement information representative of the result of judgement by analyzing a movement amount of the air traffic controller on the basis of the position information, an air traffic control information management portion for receiving air traffic control information from an outside system to obtain a latest management state and to produce latest air traffic control information representative of the latest management state, a display data generator, coupled to the display renewal judgement portion and the air traffic control information management portion, for generating display data on the basis of the judgment information and the latest air traffic control information sent from the air traffic control information management portion, and a display portion for displaying the display data. The latest air traffic control information is thus displayed as the display data on the display portion in accordance with the position of the air traffic controller determined by the judgement information According to another aspect of this invention, an image control system is for visually displaying an image on a display screen of a display portion which is watched by a viewer from both a front position of the display portion and a plurality of angle positions inclined from the front position. The image control system comprises a position detection sensor for detecting a position of the viewer in relation to the display screen to obtain position information representative of the position of the viewer and image modifying means, responsive to the position information, for modifying the image on the basis of the position information into a modified image when the display screen is watched by the viewer from the angle positions.

In this event, the image modifying means comprises storage means for successively storing, as the image, a reference image seen from the front position and producing means for producing the modified image identical with the reference image even when the display screen is watched by the viewer from the angle positions.

Herein, the image on the display screen may be watched as a plurality of reduced viewing area images from the angle positions in comparison with that watched from the front position. In this case, the image modifying means comprises storage means for storing the reduced viewing area images, selecting means for successively selecting the reduced viewing area images on the basis of the position information as a selected viewing area image, and means for producing the selected viewing area image as the modified image.

Furthermore, the image on the display screen may be varied from one image to another image when the viewer is moved. In this case, the image modifying means comprises storage means for storing one image and another image, detecting means, responsive to the position information, for detecting the position of the viewer to select either one of the one image and another image as a selected image, and producing means for producing the selected image as the modified image.

DESCRIPTION OF THE PREFERRED EMBODIMENTS

Figure 1:
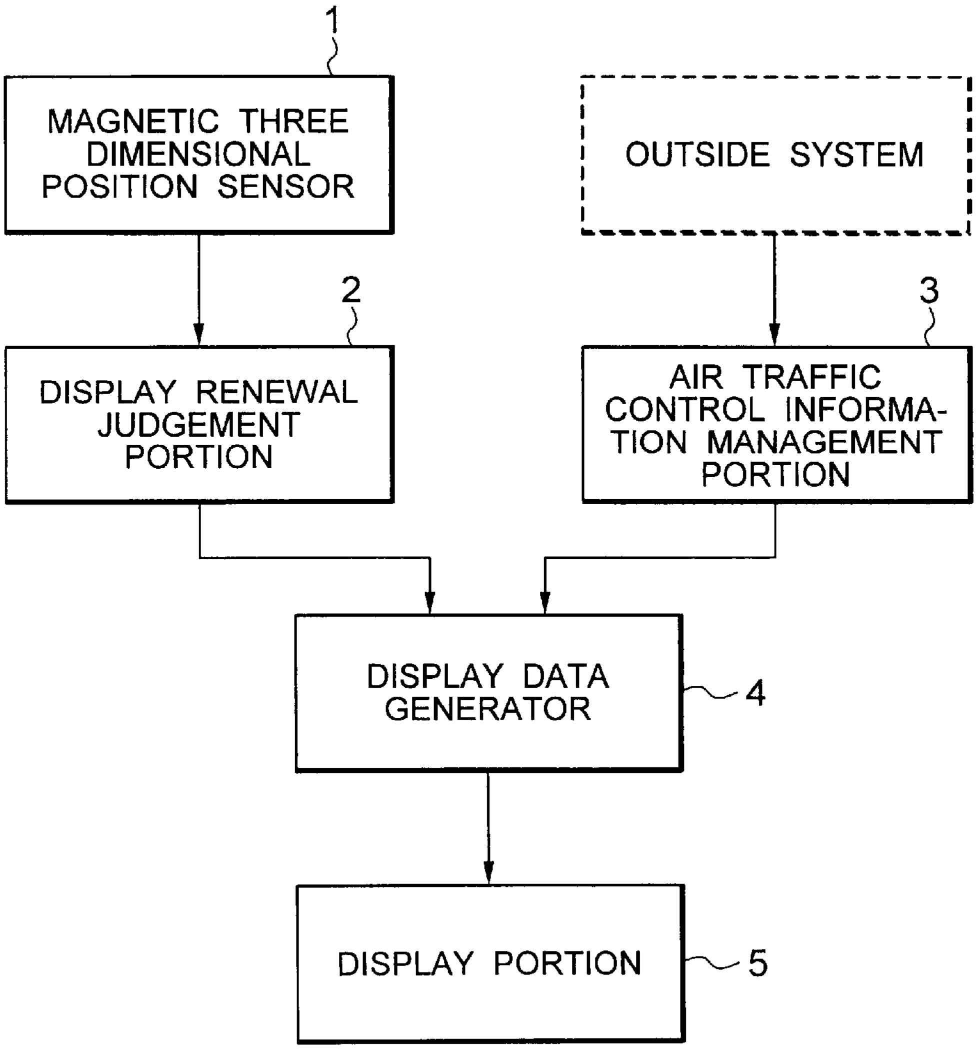
FIG. 1 shows a block diagram of an air traffic control system according to an embodiment of this invention.

Referring to FIG. 1, an air traffic control system according to an embodiment of this invention comprises, as a position sensor, a magnetic three dimensional position sensor 1 which serves to detect a position of an air traffic controller (not shown). The magnetic three dimensional position sensor may be, for example. FASTRAK (product name) sold and manufactured by Polhemus in USA. As known in the art, The magnetic three dimensional position sensor 1 has a transmitter for generating, a magnetic field and a receiver for detecting the magnetic field. In the illustrated example, the receiver is attached to a body of the air traffic controller. For example, the receiver may be worn at a part adjacent to eyes of the air traffic controller.

At any rate, the magnetic three dimensional position sensor 1 detects the position of the air traffic controller at a predetermined period to transmit to a display renewal judgement portion 2, a position detection signal which is representative of the detected position of the air traffic controller and which will be called position information. The display renewal judgement portion 2 calculates an amount of movement of the air traffic controller on the basis of the position detection signal. In addition, the display renewal judgement portion 2 further analyzes a movement of the air traffic controller in accordance with the amount of movement (namely, movement amount) calculated and detects a moving state or a stationary state of the air traffic controller. Furthermore, the display renewal judgement portion 2 further judges whether or not a display image should be changed or switched to another direction or angle in consideration of the position of the air traffic controller (namely, the position information). Thus, the display renewal judgement portion 2 transmits a result of judgement and the detection position to a display data generator 4. The result of judgement is representative of whether or not the display renewal is needed and may be called judgement information.

In the illustrated example, the air traffic control system further comprises an air traffic control information management portion 3 which receives, from an outside system, air traffic control information related to a flight plan and an airport surface state. Such air traffic control information is managed by the air traffic control information management portion 3 and is transmitted to the display data generator 4 as newest or latest air traffic control information.

Thus, the display data generator 4 is supplied with the newest air traffic control information from the air traffic control information management portion 3 and with the result of judgement and the detection position from the display renewal judgement portion 2. The display data generator 4 generates display data and supplies the same to a display portion 5. The display data is displayed on the display portion 5.

Figure 2:
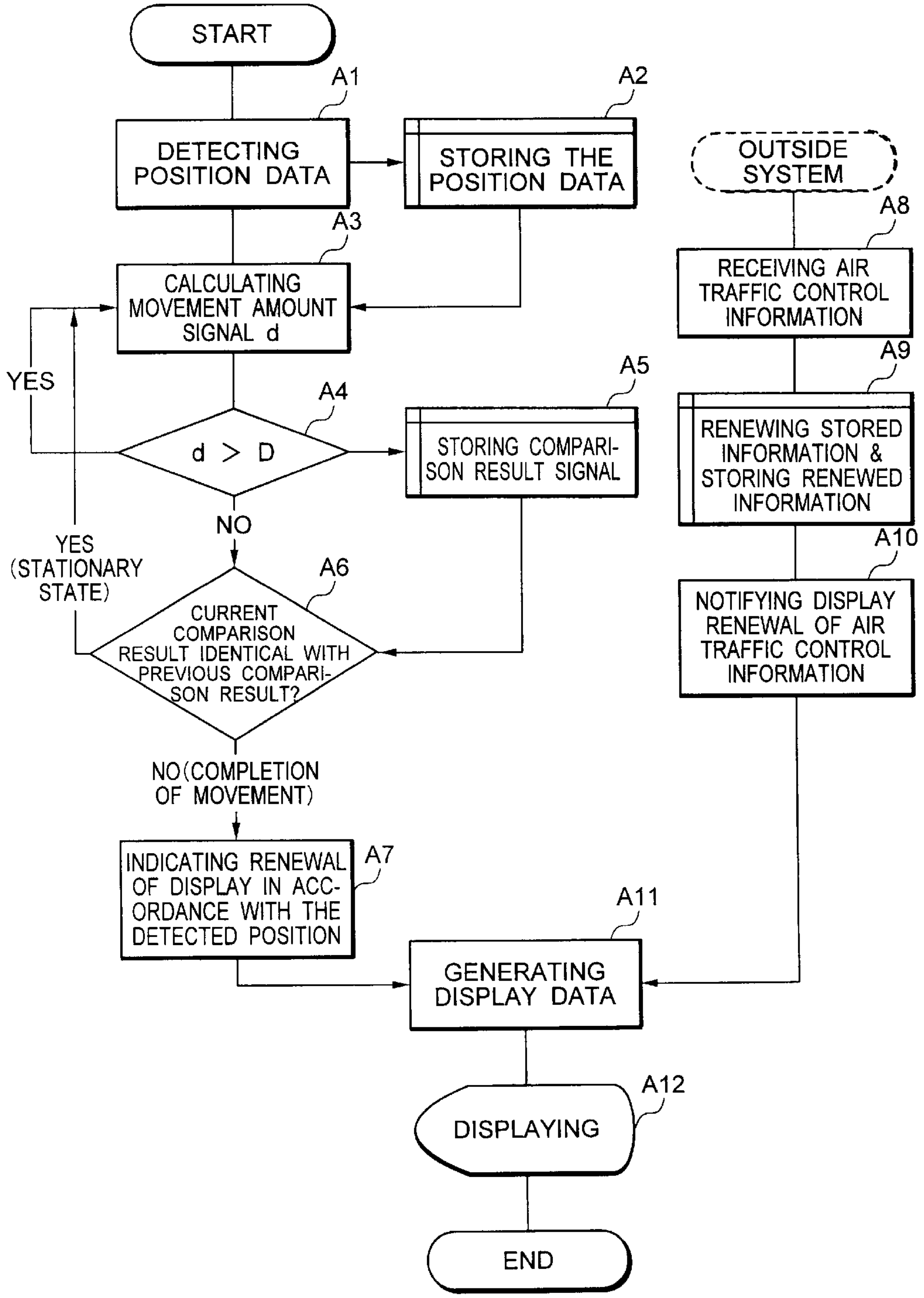
FIG. 2 shows a flow chart for use in describing operation of the air traffic control system illustrated in FIG. 1.

Referring to FIG. 2 in addition to FIG. 1, the above-operation will be described more in detail. In FIG. 2, the position of the air traffic controller is detected as position data at a step A1 by the magnetic three dimensional position sensor 1 (step A1). The detected position data or information is transmitted as a current position detection signal to the display renewal judgement portion 2 and is stored therein (step A2). The display renewal judgement portion 2 stores a previous position detection signal concerned with a previous position of the air traffic controller. Under the circumstances, the display renewal judgement portion 2 calculates an amount of movement of the air traffic controller by comparing both the previous position detection signal with the current position detection signal and produces a movement amount signal d representative of a difference or deviation between the previous and the current positions (step A3).

Subsequently, the display renewal judgement portion 2 compares the movement amount signal d with a reference signal D representative of a predetermined reference value (step A4) to judge whether or not the air traffic controller is now being moving. A result of comparison is stored as a comparison result signal in the display renewal judgement portion 2 (step A5).

If the movement amount signal d is greater than the reference signal D, the display renewal judgement portion 2 judges that the air traffic controller is now moving and returns the processing back to the step A3. On the other hand, if the movement amount signal d is not greater than the reference signal D, the processing is moved from the step A4 to a step A6. At the step A6, the display renewal judgement portion 2 compares the previous and stored comparison result signal with the current comparison result signal to judge whether or not the current comparison result signal is identical with the previous comparison result signal.

When the current comparison result signal is identical with the previous comparison result signal, the air traffic controller does not move from a previous position, namely, is in the stationary state by the display renewal judgement portion 2, processing is returned back to the step A3, as shown in FIG. 2. In consequence, the next following movement amount is calculated by the display renewal judgement portion 2.

On the other hand if the result of judgement (current comparison result signal) at the step A6 is not equal to the previous comparison result signal, the display renewal judgement portion 2 judges that the air traffic controller stops moving. Thus, the processing is moved from the step A6 to a step A7. At the step A7, the display renewal judgement portion 2 informs the display data generator 2 that a display position is to be renewed in accordance with the detected position of air traffic controller.

Now, the air traffic control information is given from the outside system and is received by the air traffic control information management portion 3 (step A8). The air traffic control information management portion 3 renews stored air traffic control information into the received air traffic control information (step A9) and notifies the display data generator 4 of display renewal of the air traffic control information (step A10).

At a step A11, the display data generator 4 generates the display data on the basis of the indications issued at the steps A7 and A10 by the display renewal judgement portion 2 and the air traffic control information management portion 3. The display portion 5 visually displays the display data received from the display data generator 4 (step A12). Thus, display renewal processing is finished.

Figure 3:
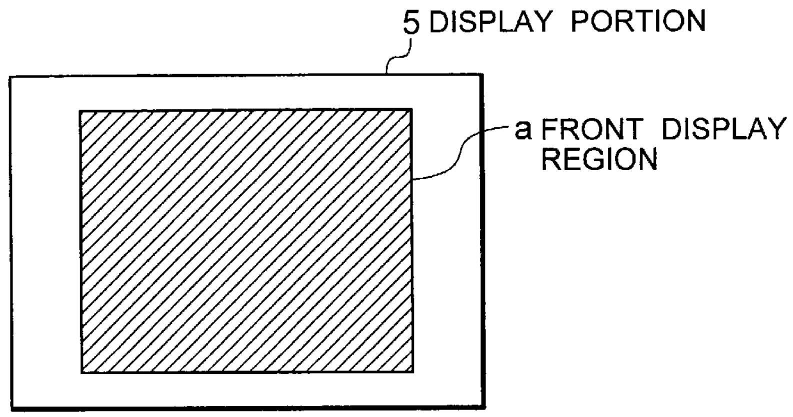
FIG. 3 shows a display screen for use in describing a front display region.
Figure 4:
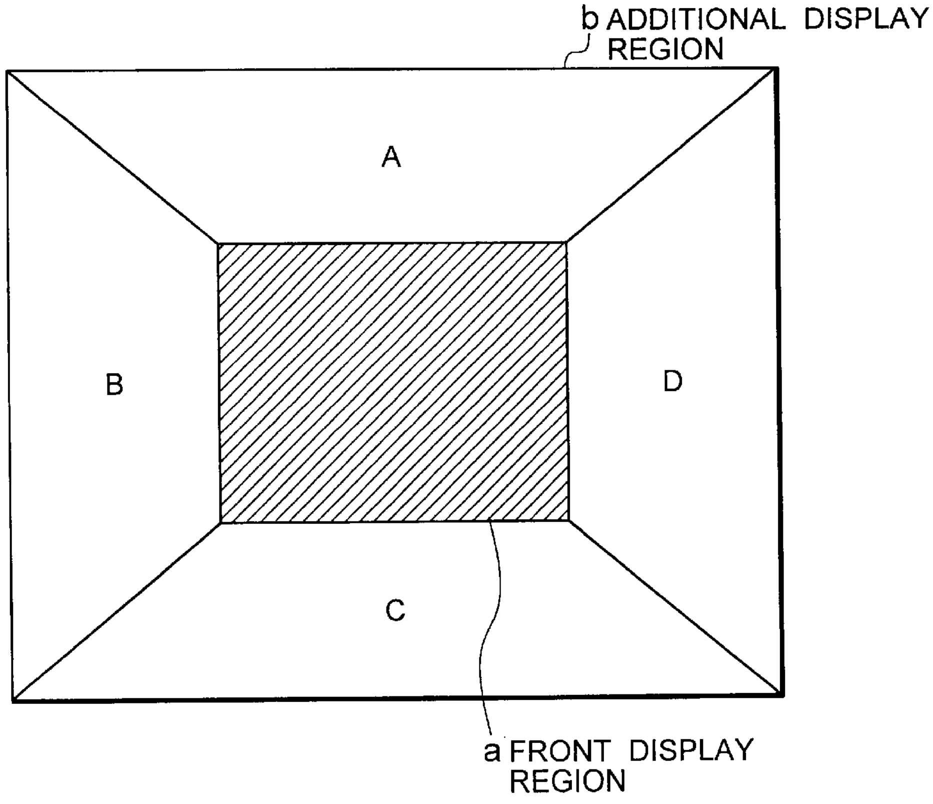
FIG. 4 shows a display screen for use in describing other display sub-areas surrounding the front display region.

Referring to FIGS. 3 and 4, description will be made about another embodiment according to this invention. A hardware structure according to an air traffic control system of this embodiment is similar to that illustrated in FIGS. 1 and 2 and will not be described later. The air traffic control system according to this embodiment is specified by a front display region a hatched, as shown in FIG. 3. The hatched front display region a of the display portion 5 represents a front display region watched from a predetermined front position of the display portion 5.

In addition, it is assumed in FIG. 4 that the display portion 5 further internally stores an additional display region b in addition to the front display region a. The illustrated additional display region b is divided into sub-areas A, B, C, and D in addition to the hatched display region a, as shown in FIG. 4. The sub-area A is representative of a display area selected when the display portion 5 is seen from a lower side of the screen of the display portion 5 while the sub-area B is representative of a display area selected when the display portion 5 is seen from an upper side of the screen. Likewise, the sub-areas B and D are representative of display areas selected when the display portion 5 is seen from righthand and lefthand sides of the screen, respectively.

With this structure, when the screen of the display portion 5 is watched from the lower side of the screen, the sub-area A is read out of the air traffic control information management portion 3 and is displayed on the display portion 5. This applies to any other sub-areas B, C, and D.

As a result, the display data generator 4 (FIG. 1) selects the sub-areas A, B, C, and D on the basis of the position of the air traffic controller and sends the display data to the selected sub-area to display the display data on the screen (a) of the display portion 5.

Thus, the sub-areas A, B, C and D are switched from one to another in response to a movement of the position of the air traffic controller and is selectively displayed on the screen hatched in FIG. 4. Herein, there is an air traffic control system such that a display image is manually switched each time when the position of the air traffic controller is moved or changed. If the embodiment according to this invention is applied to such a system, this invention effectively dispenses with any manual operation for switching the display portion and is effective to reduce a load imposed on the air traffic controller.

Herein, it is often preferable that the image on the screen seen from a plurality of angle positions is identical with the image seen from the predetermined front position. On the other hand, when the image is seen from an inclined position, a visible image area on the screen is reduced in comparison with the image area seen from the front position of the screen. Alternatively, it is preferable that the air traffic information displayed as the image would be changed to another information with reference to the position of the air traffic controller.

Figure 5:
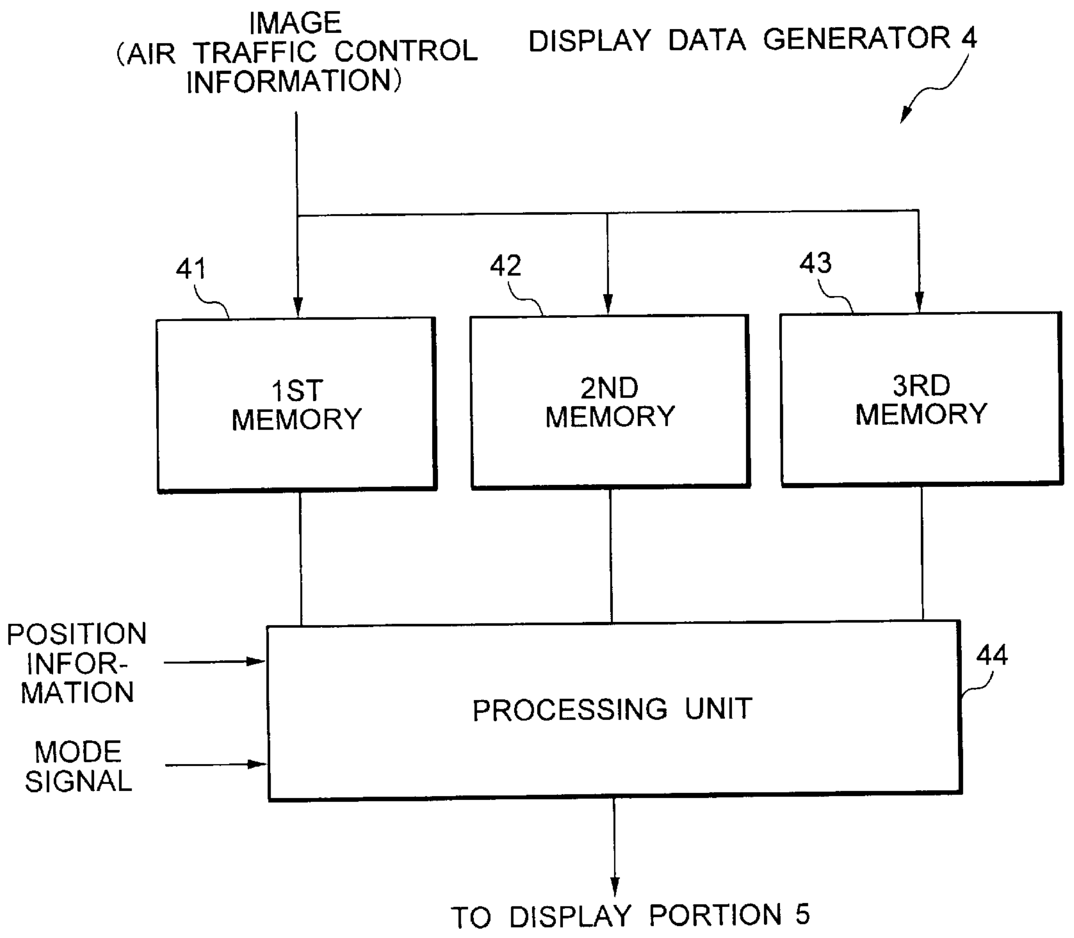
FIG. 5 shows a block diagram of a display data generator according to another embodiment of this invention.

Referring to FIG. 5, description will be made about the display data generator 4 (FIG. 1) which can fulfill the above-mentioned requirements and which is operable to modify the image seen from the front position. Therefore, the display data generator 4 shown in FIG. 5 may be called a modifying portion. The display data generator 4 illustrated in FIG. 5 has first, second, and third memories 41, 42, and 43 and a processing unit 44 supplied as the position information with the detected position of the air traffic controller and a mode signal indicative of the above-mentioned displays. In the illustrated example, the first memory 41 stores the air traffic control information seen from the front position as a reference image. When the display data generator 4 is given the mode signal representative of displaying the reference image, the reference image is displayed on the screen of the display portion 4 under control of the processing unit 44 even when the position information is representative of the movement of the air traffic controller. This means that, when the screen is watched by the air traffic controller at a position inclined from the front position, the first memory 41 and the processing unit 44 serves to display the reference image on the screen and will be referred to as a first circuit.

The second memory 42 stores a shaped image of the newest air traffic control information in consideration of the case where the image on the screen is reduce when the image is watched from an oblique position in comparison with that seen from the front position. The shaped image may be reduced in an amount of information and may be prepared at every angle. As a result, the shaped image is displayed as a reduced viewing area image. At any rate, the second memory 42 is operable to compensate for a reduction of a display areas of the display portion 5 in cooperation with the processing unit 44. In this case, the processing unit 44 is helpful to select the reduced viewing area image and to send the same to the display portion 5 and a combination of the second memory 42 and the processing unit 44 may be called a second circuit.

Furthermore, the third memory 43 successively stores a plurality of images each of which is representative of air traffic control information different from one another. The processing unit 44 reads either one of the images out of the third memory 43 with reference to the position information and sends the same to the display portion 5. Thus, the third memory 43 and the processing unit 44 serves to detect the position of the air traffic controller to select one of the images and may be named a third circuit. From this fact, it is readily understood that the air traffic controller can automatically select and display necessary air traffic control information.

As mentioned before, it is readily understood that the embodiments according to this invention detects the position of the air traffic controller by using the magnetic three dimensional position sensor and produces the necessary air traffic control information in consideration of the position of the air traffic controller. In addition, the display of the air traffic control information is renewed by judging the movement of the air traffic controller and by detecting completion of the movement of the air traffic controller. This means that consideration is made in this invention about movement hysteresis of the air traffic controller.

Thus, this invention is very effective to improve visibility of the display portion because an image can be displayed which is seen from a front with reference to the position of the air traffic controller or which is selected in consideration of the order predetermined with reference to necessity and importance of the image. Alternatively, this invention can automatically switch the image on the basis of the position of the air traffic controller. Therefore, no manual switching is needed in this invention.

At any rate, the displayed image is automatically switched from one to another on the basis of the position of the air traffic controller. This means that the air traffic controller devotes to navigation of the aircraft without manual, operation of switching the images. In other words, this invention is advantageous in that it is possible to alleviate a load imposed on the air traffic controller and to realize a safe flight.

While this invention has thus far been described in conjunction with a few embodiments thereof, it will readily be possible for those skilled in the art to put this invention into practice in various other manners. For example, this invention may be used to control a mobile body, such as an vehicle or a ship and can obtain similar effects. In this event, an image on a screen can be varied in accordance with a position of a viewer.

What is claimed is:

1. An air traffic control system for use in providing air traffic control information to an air traffic controller so as to control traffic of an aircraft, comprising:

a position detection sensor for detecting a position of the air traffic controller to obtain position information representative of the position of the air traffic controller; and means for selectively displaying the air traffic control information on a display portion in a predetermined order in accordance with the position information without moving the display portion.

2. An air traffic control system as claimed in claim 1, wherein the position detection sensor is formed by a magnetic three-dimensional position sensor.

3. An air traffic control system for providing air traffic control information to an air traffic controller so as to control traffic of an aircraft comprising:

a position detection sensor for detecting a position of the air traffic controller to obtain position information representative of the position of the air traffic controller;

a display renewal judgement portion for judging whether or not display is to be renewed with reference to the position information to obtain and to produce judgement information representative of the result of judgement, by analyzing a movement amount of the air traffic controller on the basis of the position information;

an air traffic control information management portion for receiving air traffic control information from an outside system to obtain a latest management state and to produce latest air traffic control information representative of the latest management state;

a display data generator, coupled to the display renewal judgement portion and the air traffic control information management portion, for generating display data on the basis of the judgment information and the latest air traffic control information sent from the air traffic control information management portion;

a display portion for displaying the display data; and the latest air traffic control information being thus displayed as the display data on the display portion in accordance with the position of the air traffic controller determined by the judgement information without moving the display portion.

4. An air traffic control system as claimed in claim 3, wherein the display data generator comprises:

first means for always providing, to the air traffic controller, an image which is viewed from a front position of the display portion in response to the judgement information to produce the display data representative of the image, even when the position of the air traffic controller is changed from the front position.

5. An air traffic control system as claimed in claim 3, wherein the display data generator comprises:

second means for shaping the latest air traffic control information into shaped air traffic control information in response to the judgement information so as to compensate for a reduction of a display area of the display portion that is caused to occur when the display portion is seen from an oblique position by the air traffic controller by the air traffic controller;

the shaped air traffic control information being produced as the display date.

6. An air traffic control system as claimed in claim 3, the air traffic control information being varied from first display information to second display information in accordance with a movement of the position of the air traffic controller;

wherein the display data generator comprises:

third means for switching the air traffic control information between the first display information and the second display information in accordance with the position of the air traffic controller to produce switched display information as the display data.

7. An air traffic control system as claimed in claim 3, wherein the display data generator comprises:

first means for always providing to the air traffic controller, an image which is viewed from a front position of the display portion in response to the judgement information to produce the display data representative of the image, even when the position of the air traffic controller is changed from the front position;

second means for shaping the latest air traffic control information into shaped air traffic control information in response to the judgement information so as to compensate for a reduction of a display area of the display portion that is caused to occur when the display portion is seen from an oblique position by the air traffic controller;

third means for switching the air traffic control information from one to another to obtain switched air traffic control information in accordance with the position of the air traffic controller; and selecting means for selecting one of the image, the shaped air traffic control information, and the switched air traffic control information to produce the display data.

8. An air traffic control system as claimed in claim 3, wherein the display renewal judgement portion comprises:

means for monitoring the position information detected at a predetermined period to judge whether or not the air traffic controller is being moved; and means for renewing displays when the movement of the air traffic controller is finished.

9. An air traffic control system as claimed in claim 2, wherein the position detection sensor is formed by a magnetic three-dimensional position sensor.

10. An image control system for visually displaying an image on a display screen of a display portion which is watched by a viewer from both a front position of the display portion and a plurality of angle positions inclined from the front position, comprising:

a position detection sensor for detecting a position of the viewer in relation to the display screen to obtain position information representative of the position of the viewer; and image modifying means, responsive to the position information, for modifying the image on the basis of the position information into a modified image when the display screen is watched by the viewer from the angle positions without moving the display screen.

11. An image control system as claimed in claim 10, wherein the image modifying means comprises:

storage means for successively storing, as the image, a reference image seen from the front position; and producing means for producing the modified image identical with the reference image even when the display screen is watched by the viewer from the angle positions.

12. An image control system as claimed in claim 10, the image on the display screen being watched as a plurality of reduced viewing area images from the angle positions in comparison with that watched from the front position, wherein the image modifying means comprises:

storage means for storing the reduced viewing area images; and selecting means for successively selecting the reduced viewing area images on the basis of the position information as a selected viewing area image; and means for producing the selected viewing area image as the modified image.

13. An image control system as claimed in claim 10, the image on the display screen being varied from one image to another image when the viewer is moved, wherein the image modifying means comprises:

storage means for storing one image and another image; and detecting means, responsive to the position information, for detecting the position of the viewer to select either one of the one image and another image as a selected image; and producing means for producing the selected image as the modified image.

14. An image control system as claimed in claim 10, which is used for a traffic control system for controlling traffic of a mobile body.

15. An image control system as claimed in claim 14, wherein the mobile body is an aircraft.

16. An image control system as claimed in claim 15, wherein air traffic control information is displayed as the image on the screen of the display portion to control air traffic of the aircraft and is observed as the viewer by an air traffic controller.

17. An image control system as claimed in claim 16, further comprising:

judging means, coupled to the position detection sensor, for judging whether or not the position detection information is to be renewed to produce renewed position detection information when the position detection information is renewed;

receiving means for receiving air traffic control information to supply the air traffic control information to the image modifying means and to display the air traffic control information as the image on the display portion.

18. An image control system as claimed in claim 17, wherein the receiving means comprises:

storing means for successively storing the air traffic control information; and supply means for supplying a latest one of the air traffic control information to the modifying means.

19. An image control system as claimed in claim 14, wherein the mobile body is a ship.

20. An image control system as claimed in claim 14, wherein the mobile body is an automobile.

* * * * *